United States Patent Office 3,011,903
Patented Dec. 5, 1961

---

3,011,903
PROCESS FOR PATCHING AND REPAIRING SURFACE DEFECTS IN PLYWOOD AND THE LIKE AND THE ARTICLES RESULTING THEREFROM
Gerald E. Clock, Walter E. F. Rupprecht, and Ira J. Cummings, Midland, Mich., assignors to The Dow Chemical Company, Midland, Mich., a corporation of Delaware
No Drawing. Filed Feb. 13, 1958, Ser. No. 714,967
13 Claims. (Cl. 117—2)

This invention relates to a process for providing an improved surface on plywood and low and medium density composition boards, especially plywood having surface blemishes due to knots, splits, and similar defects. More particularly it relates to such a process for providing a smooth surface having uniform paintability.

The process of the present invention involves in basic essentials the following sequence of operations:

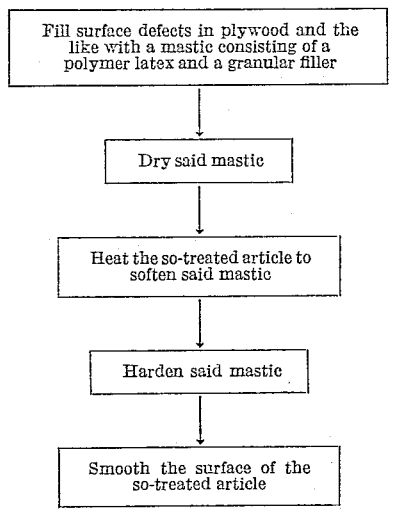

Plywood is used extensively as a construction and paneling material. As it is commonly prepared plywood consists of a plurality of thin sheets or plies of wood that has been peeled circumferentially from a log, which sheets are laminated together with adhesives under heat and pressure. As the plies are peeled from the log, knots and other defective portions are sliced through and become a part of the sheet. When boards having those defects are used in the surface veneers they present an unsuitable surface for use in paneling or other visible use. The knots fall out and in the past were replaced manually with wood plugs secured by adhesives. Other blemishes are caused by gouging, by impacts, or similar treatment. Cracks, splits, and other defects and blemishes in the surface veneer, although not seriously affecting the structural strength of the board, are nevertheless considered sufficient cause to reject the board for use where decorative appearance is desired as in paneling, cabinetwork and the like. Such cracks, splits, and knotholes also cause severe difficulties when it is desired to apply a decorative topcoat to the board. In those cases the existence of the unfilled defect is "telegraphed" to the coated surface, thereby reducing the value effect of the coating treatment.

It would be desirable to have blemish-free surface veneers for all plywood. However, the industry is faced by the dilemma of a dwindling supply of high grade surface venners and an increased demand for plywood suitable for paneling, cabinetwork and other similar uses. Many materials are capable of filling knot holes, cracks, splits, and like defects. Without exception, however, the heretofore known materials have different paintability, or different paint absorbing characteristics than the surface of the plywood itself. Thus, the repair of the original blemish provides results that usually are little bettter than having the blemish itself. To achieve uniform paintability in those repaired plywoods, it is commonplace to provide over the patched surface veneer, a bonded veneer of a resin-impregnated paper or similar material. Such materials and the processes of application are costly. Furthermore, when they are applied over boards having unfilled surface blemishes, such bonded veneers, as previously mentioned, are unsatisfactory.

The problems of surface defects are also present in the low and medium density composition boards, exemplified by insulation board and particle board. Because those boards are not well adapted for repair with glued-in-place patches, it has been most difficult to achieve any upgrading of those boards.

In upgrading the surfaces of plywood and composition boards it is mandatory that the treated surface be capable of treatment by the usual wood-working operations, such as sanding and sawing which are commonly employed in fabricating the boards into useful articles. The finished surface must have good paint bonding characteristics and uniform paint absorbency, so that fillers, sealers, or primers are not necessary to achieve paintability. Extensive continuous search has been made to find suitable compositions and processes for upgrading plywood.

Accordingly it is the principal object to provide an improved process for upgrading plywood and composition boards.

It is a further object to provide such a process for repairing knotholes, cracks, splits, gouges, and similar deep surface defects in such boards.

It is a still further object to provide such a process whereby an improved surface having uniform paintability is applied to such boards.

Another object is the provision of such a process whereby a surface capable of working with conventional wood-working tools is achieved.

Still another object is the provision of a board having such an improved surface.

The above and related objects are accomplished by means of the process wherein the defects in boards are filled with a mastic consisting essentially of certain aqueous polymeric latexes and fillers and is allowed to dry. The invention likewise contemplates the board treated in accordance with the stated process.

With the term, "board," it is meant to include those building materials having a relatively soft, porous, flat, non-metallic surface. Such materials usually are faced or surfaced with wood, paper, or other cellulosic material. Typical of those materials are plywood and composition boards of low and medium density, such as particle boards and chipboards. Another material is wall board, which commonly consists of a plaster core sandwiched between two layers of pressed paper. Still another board is fiber board, which is a rigid mat of pressed wood, asbestos, or like fibers. Each type of material is subject to its own type of surface defect. Thus, plywood may have minor splits and cracks in the surface veneer. Chipboard may lose a chip in its surface. The invention is not intended to plug holes, to fill knotholes, to remedy deep cuts, or to act as a mastic. It is intended to hide and to overcome the minor surface defects and blemishes inherent in such materials and to overcome non-uniform paintability of a surface while at the same time acting as a sealer.

The aqueous polymer latexes useful in the process of this invention are those of polymers and copolymers exhibiting good binding power to the hard, inert fillers employed. Those latexes of relatively soft polymers and copolymers which are film-forming by simple deposition on an impervious substratum followed by air drying are those of maximum utility. Typical examples of such latexes are those of styrene and butadiene containing from about 60 to 70 percent styrene, polyvinyl acetate and copolymers of vinyl acetate with another copolymerizable monomer, such as vinyl chloride and acrylonitrile polymers and copolymers of the alkyl acrylates, and rubber hydrochloride. Further examples are ternaries of the above-mentioned monomers as well as those of vinylidene chloride and vinyl chloride which have been internally plasticized by polymerization therein of an alkyl acrylate. All of the above mentioned examples are commercially available in latex form. Other examples of operable polymeric materials will be within the skill of the worker in the polymer latex art. Latexes of polymers which are not commercially available may be readily prepared by the well-known methods of emulsion polymerization. The latexes should be film forming through simple deposition and air drying if continuous, coherent surface treatments are to be achieved. Although a normally non-film-forming latex could be formed into a useful thin coating for blemish-free boards by application of elevated temperature and pressure, such a latex is virtually impossible to employ in patching cracks, splits, knot-holes, and like defects found in plywood and composition boards. In those instances the surface may be so formed into a film but the polymer solids filling the defect remain unfused with poor adhesion.

The fillers which are useful in this process are those having a bulk density which is at least as great as that of the wood being repaired and which are of a particular particle size. When a filler having a bulk density that is less than the wood is used, it is most difficult to arrive at a coherent patch which is fused throughout. The filler also should have a low hygroscopicity and absorbency to give adequate water resistance. It should also have adequate hardness for sandability and similar wood smoothening operations. Sand is a readily available filler meeting these requirements and is preferred. It is essential that the particle size of the filler be of from 40 to 200 mesh and preferably at least of a size which will pass through a 60 mesh screen of the U.S. Standard Sieve Series. If larger particles are used than of about 40 mesh, the resulting patch is evidenced by a significant reduction in those properties, such as strength, paint absorbency, adhesion, and the like, which are dependent upon a homogeneous dispersion. Fillers having sizes of less than about 200 mesh are less available and are more difficult to disperse than those of the stated range. However, when dispersed the resulting patches usually exhibit the desired properties. Most fillers are sold in such finely divided form, but, if necessary in a given case, may be ground or comminuted by conventional means prior to incorporation.

It is also possible to employ mixtures or blends of either the latex or the fillers if desired for a special property or to achieve a special effect. Each of the components of such mixture or blend must satisfy all of the requirements of a single material.

The amount of filler used in the mastic may be varied between wide limits. Amounts of mastic as low as 50 percent by weight of the latex solids may be employed, but with such small amounts it has been found that there is considerable shrinkage during drying and fusion so that a second application is usually necessary. To minimize such shrinkage it is preferred to employ the filler in a concentration of at least 100 percent by weight of the latex solids. The upper limit of filler concentration is determined by the tolerance and binding capacity of the latex and by the fluidity desired in the mastic for the specific doctoring apparatus employed. In most cases the maximum concentration will not exceed over about 200 percent by weight of the latex solids. The choice of the filler and its concentration will be dictated to some extent by the binding power of the copolymer, the nature and particle size and geometry of the filler, and to some extent by the type of substratum being treated. The optimum concentration of filler in any given application is easily determined by simple preliminary experiment.

The mastic of this invention is prepared by simply blending the fillers into the latex. Conventional techniques and equipment will be known by the skilled worker for arriving at those blends.

Although the sequence of addition of the ingredients is of no critical importance, it has been found to be most convenient to add the various solids to the latex gradually with agitation. If latex stabilizers are to be incorporated into the latex, they will be added first followed by the fillers, and finally by any thickeners. Any conventional blending apparatus may be used for the intermixing. It is only important and critical that a uniform dispersion of all elements of the composition be attained, since any heterogeneity of the dispersion will be reflected in non-uniformity of the patch.

The process of the invention consists essentially of the steps of filling the surface defects of the substratum with the mastic described above followed by air drying and then by fusion under conditions of applied pressure and elevated temperature.

The defects in the substratum may be filled with the mastic by merely puddling the dispersed material into the defect. It is best to use a slight excess of mastic so that the undried material protrudes above the surface of the substratum. There is almost always a slight shrinkage of the mastic during drying and fusing and the use of an excess assures that the defect will be completely filled when dry. If an excess remains after drying and fusing it is easily machined off by sanding or other standard woodworking operation. It should be apparent that it is necessary that the defect be completely filled with the mastic prior to drying or the repair will be of little more advantage than the original defect. Thus, manual tamping or doctoring of the mastic may be required before drying.

Following application of the mastic the filled patch is allowed to air dry at room temperature or at slightly elevated temperature. The drying of an aqueous latex composition involves evaporation of the aqueous vehicle and the simultaneous coalescence or partial agglomeration of the latex polymer solids. If excessively high temperatures are employed the possibility exists that the surface of the mastic will dry completely into a substantially coherent film entrapping the water of the mastic which lies between said film and the substratum and also that blisters will form at the surface of the patch. Temperatures of from room temperature to about 70 or 80° C. or slightly higher have been found to be useful for drying the mastic.

After drying the treated substratum is subjected to applied pressure and elevated temperatures to soften the mastic within the patch to force the mastic to fill the void more completely to improve adhesion, to result in a smooth surface, to insure complete drying, and to assure that the patch is permanent. The pressures and temperatures required are dependent upon the specific polymer employed, the filler, and the nature of the substratum. The pressures and temperatures commonly used in the plywood industry have been found to be adequate usually. Those temperatures are in the range of from about 200 to 350° F. and the pressures are in the range of from about 100 to 325 pounds per square inch. The materials are generally exposed to the treatment for not over about 5 minutes. The softening temperatures of any given polymeric material will be known or may be easily determined by simple preliminary experiment. The treatment with applied pressure and elevated temperatures may be carried out by known means, as by pressing or calendering.

The article so treated may then be sanded or subjected to other conventional woodworking operations which are commonly used to give a merchandisable material. After sanding or other smoothening the article is suitable as such for use in the usual applications to which such boards are put. It should be apparent, however, that the patches of such mastic are visible, so that if paneling or other similar use is contemplated, the board must be covered with an opaque coating, such as paint. The paint absorbency of the patch and the board is such that a uniform coating capable of completely hiding the patch is possible. The paints or other coating material may be of any type which will be suitable for coating wood. Those coating materials may be applied by any of the conventionally accepted techniques, such as brushing, rolling or spraying.

If a product is to be coated with a material of limited hiding power, it is necessary to apply a resin topcoat after patching with the mastic. Such a topcoat is described in the concurrently filed application of G. E. Clock, U.S. Serial No. 714,936, filed February 13, 1958, and now abandoned. A particularly desirable topcoat formulation consists of a certain vinyl chloride-vinylidene chloride copolymer composed predominantly of vinyl chloride and which is optionally filled with certain materials such as wood flour, calcium carbonate, barium sulfate, sand, silica, and the like. Although any thermoplastic resin having a softening temperature in the range employed by industry for manufacture of the boards may be used, the above described copolymer has been found to have in coating form especially desirable properties and characteristics of hardness, toughness, adhesion, binding power for fillers, chemical resistance, paintability, and the like. Other examples of copolymers which are useful are those of styrene and butadiene, of ternary polymers, of vinylidene chloride, vinyl chloride, and acrylonitrile or other acrylic monomers, of the polymers and copolymers of vinyl acetate, and of similar known polymeric products.

It is preferred to employ a filler within the topcoat. Any of the known fillers may be employed for this application. A preferred filler is wood flour. When a filler is used it has been found that it may be used in a concentration of up to about 50 to 60 percent by weight of the topcoat formulation. When significantly more than 60 percent is employed, the filler may not be completely bound and may result in an uneven, unattractive surface of reduced eye appeal and of non-uniform paintability. The filler must have a small particle size of about that described for the mastic if smooth coatings are to result.

The topcoat formulations may be prepared in any conventional manner. If desired other additives which are commonly used in such coating formulations may be blended therein. Typical of such additives are stabilizers, pigments, dyes, plasticizers and the like.

The topcoat formulation may be applied by any of the conventional application techniques. For example the formulation may be sifted onto the board and doctored to approximate uniformity. After application the coated article is fused. This resin topcoat may be applied prior to or after fusion of the mastic. In any event the mastic must be dried prior to topcoat application. The topcoated article may be fused under applied pressure and elevated temperatures. These pressure and temperature conditions should be within the ranges described supra for the mastic.

The boards treated with the compositions and process of this invention may be worked in any of the standard woodworking operations. For example they may be sawed, drilled, sanded, or shaped and smoothed with any technique that is suitable for use with the board per se. In addition the surface has a physical smoothness, a uniform appearance, and homogeneous paint absorbency characteristics so that it may be coated with translucent coatings of limited hiding power. Also decorative papers, fabrics and the like may be laminated thereto.

The advantages of the compositions and process will be more apparent from the following illustrative examples wherein all parts and percentages are by weight unless otherwise indicated.

Example 1

A mastic formulation was prepared by blending 15 parts of ground asbestos sold commercially as Asbestine X, 55 parts of 120 mesh ground silica, Silex, 15 parts of calcium carbonate of a particle size of from 16 to 40 microns and 0.3 part of finely ground tetrasodium pyrophosphate into 31 parts of a latex of a copolymer prepared from 67 percent styrene and 33 percent butadiene thickened with 0.2 part of a 400 cps. hydroxypropyl methyl cellulose. The latex contained about 50 percent non-volatile solids. This formulation was puddled into the knotholes of a soft-wood plywood with a slight excess and allowed to air dry. After air drying the board was subjected to a pressure of about 100 pounds per square inch at about 200° F. for 30 seconds. The patches were sanded smooth and paint applied to cover the whole surface of the board. The painted surface had a uniform appearance of paint absorbency. The board was sawed through a patch without affecting the adhesion or other properties of the patch.

Example 2

The knotholes of a 6" by 6" piece of plywood were filled with mastic as in Example 1. After the mastic was dry a dried topcoat formulation consisting of 50 parts wood flour passing a 60 mesh sieve and 50 parts of a copolymer of vinyl chloride and vinylidene chloride was prepared. The topcoat formulation was sifted uniformly onto the board in a weight of 50 pounds to 1000 square feet of board. The board was then pressed at 300° F. at 125 pounds per square inch for 30 seconds. A smooth hard surface was obtained. The mastic showed good adhesion to the topcoat. When paint was applied to the treated surface the paint absorbency was uniform.

What is claimed is:

1. A process for upgrading cellulosic boards having deep surface defects consisting essentially of the steps of (1) filling said defects with a mastic consisting of an aqueous polymer latex having film forming characteristics upon air drying and at least 50 percent by weight of said mastic of a hard, granular filler having a bulk density at least as great as said cellulosic board and having an average particle size of from 40 to 200 mesh as measured by the U.S. Standard Sieve Series; (2) drying said mastic at a temperature below about 70° C.; (3) subjecting the so-treated article to conditions of elevated temperature and applied pressure to soften the mastic; (4) allowing said mastic to harden, and (5) smoothening the surface of so treated article.

2. The process claimed in claim 1 wherein said steps are performed in sequence.

3. The process claimed in claim 1 wherein said steps (3) and (5) are performed simultaneously.

4. The process claimed in claim 1 wherein said filler is of a particle size that will pass through a 60 mesh sieve of the U.S. Standard Sieve Series.

5. The process claimed in claim 1 wherein said aqueous polymer latex is composed of a copolymer of styrene and butadiene.

6. The process claimed in claim 1 wherein said defects are initially filled with an excess of said mastic.

7. The process claimed in claim 1 wherein said filler is ground sand having a particle size that will pass through a 60 mesh sieve of the U.S. Standard Sieve Series.

8. The process claimed in claim 1 wherein said mastic is dried at room temperature.

9. The process claimed in claim 1 wherein said mastic is softened at the softening temperature of the copolymer while under an applied pressure of from about 100 to 300 pounds per square inch.

10. The process claimed in claim 9 wherein said applied pressure and softening temperature are maintained for not more than 5 minutes.

11. The process claimed in claim 1 wherein said cellulosic board is plywood.

12. The process claimed in claim 1 wherein said cellulosic board is a composition board.

13. As a new article of manufacture a cellulosic board having many deep surface defects filled with a dried mastic consisting essentially of a hard granular filler having a bulk density at least as great as said cellulosic board and having an average particle size of from 40 to 200 mesh as measured by the U.S. Standard Sieve Series uniformly distributed through a coherent mass of a binder composed of a copolymer of styrene and butadiene.

References Cited in the file of this patent

UNITED STATES PATENTS

| | | |
|---|---|---|
| 2,199,700 | Gramelspacher | May 7, 1940 |
| 2,419,614 | Welch | Apr. 29, 1947 |
| 2,486,235 | Watt | Oct. 25, 1949 |
| 2,554,663 | Cowgill | May 29, 1951 |
| 2,635,976 | Meiler et al. | Apr. 21, 1953 |
| 2,656,340 | Sparks et al. | Oct. 20, 1953 |
| 2,658,015 | Williams | Nov. 3, 1953 |
| 2,663,747 | Have | Dec. 22, 1953 |
| 2,770,556 | Grangaard et al. | Nov. 13, 1956 |
| 2,837,444 | Hahn | June 3, 1958 |
| 2,930,106 | Wrotnowski | Mar. 29, 1960 |